US009035265B2

(12) United States Patent
Yagi et al.

(10) Patent No.: US 9,035,265 B2
(45) Date of Patent: May 19, 2015

(54) RADIATION IMAGING APPARATUS, METHOD FOR DRIVING THE SAME AND RADIATION IMAGING SYSTEM

(71) Applicant: CANON KABUSHIKI KAISHA, Tokyo (JP)

(72) Inventors: Tomoyuki Yagi, Honjo (JP); Toshio Kameshima, Kumagaya (JP); Katsuro Takenaka, Honjo (JP); Sho Sato, Saitama (JP); Atsushi Iwashita, Honjo (JP); Eriko Sugawara, Honjo (JP); Hideyuki Okada, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/010,449

(22) Filed: Aug. 26, 2013

(65) Prior Publication Data

US 2014/0061495 A1    Mar. 6, 2014

(30) Foreign Application Priority Data

Aug. 31, 2012    (JP) .................................. 2012-192290

(51) Int. Cl.
| | |
|---|---|
| *G01T 1/00* | (2006.01) |
| *G01T 1/17* | (2006.01) |
| *H04N 5/32* | (2006.01) |
| *H04N 5/232* | (2006.01) |
| *H04N 5/378* | (2011.01) |

(52) U.S. Cl.
CPC .. *G01T 1/17* (2013.01); *H04N 5/32* (2013.01); *H04N 5/23241* (2013.01); *H04N 5/378* (2013.01)

(58) Field of Classification Search
USPC .................................................. 250/393, 394
See application file for complete search history.

(56) References Cited

U.S. PATENT DOCUMENTS

| | | | | |
|---|---|---|---|---|
| 5,818,898 | A  * | 10/1998 | Tsukamoto et al. | 378/98.8 |
| 5,969,360 | A  * | 10/1999 | Lee | 250/370.09 |
| 6,510,202 | B2 * | 1/2003 | Tamura et al. | 378/155 |
| 7,079,189 | B2 * | 7/2006 | Tsujii et al. | 348/372 |
| 8,227,757 | B2 * | 7/2012 | Yokoyama et al. | 250/354.1 |
| 2002/0001366 | A1 * | 1/2002 | Tamura et al. | 378/155 |
| 2005/0047639 | A1 * | 3/2005 | Hayashida | 382/132 |
| 2007/0125952 | A1 * | 6/2007 | Endo et al. | 250/369 |
| 2009/0304151 | A1 * | 12/2009 | Yamada et al. | 378/62 |

(Continued)

FOREIGN PATENT DOCUMENTS

| | | |
|---|---|---|
| JP | 9-140691 A | 6/1997 |
| JP | 2002-181942 A | 6/2002 |
| JP | 2010-268171 A | 11/2010 |

*Primary Examiner* — David J Makiya
*Assistant Examiner* — Taeho Jo
(74) *Attorney, Agent, or Firm* — Carter, DeLuca, Farrell & Schmidt, LLP

(57) ABSTRACT

A radiation imaging apparatus, comprising a sensor array configured to output a signal in accordance with irradiated radiation, a driving unit configured to output a signal from the sensor array by driving the sensor array, a detecting unit configured to detect irradiated radiation, a control unit configured to control the driving unit to perform first readout to read out a signal corresponding to charge accumulated in the sensor array from the sensor array and perform second readout to further read out a signal from the sensor array at least in a case where the first readout has started during irradiation of radiation, and a processing unit configured to correct the signal obtained by the first readout based on the signal obtained by the second readout.

11 Claims, 14 Drawing Sheets

(56) References Cited

U.S. PATENT DOCUMENTS

| | | | |
|---|---|---|---|
| 2010/0148080 A1* | 6/2010 | Endo et al. | 250/370.08 |
| 2010/0327176 A1* | 12/2010 | Takenaka et al. | 250/394 |
| 2011/0309262 A1* | 12/2011 | Sato et al. | 250/393 |
| 2012/0201357 A1* | 8/2012 | Watanabe et al. | 378/114 |
| 2012/0241639 A1* | 9/2012 | Yagi et al. | 250/394 |
| 2012/0242871 A1* | 9/2012 | Iwashita et al. | 348/241 |
| 2013/0051525 A1* | 2/2013 | Sato | 378/62 |

* cited by examiner

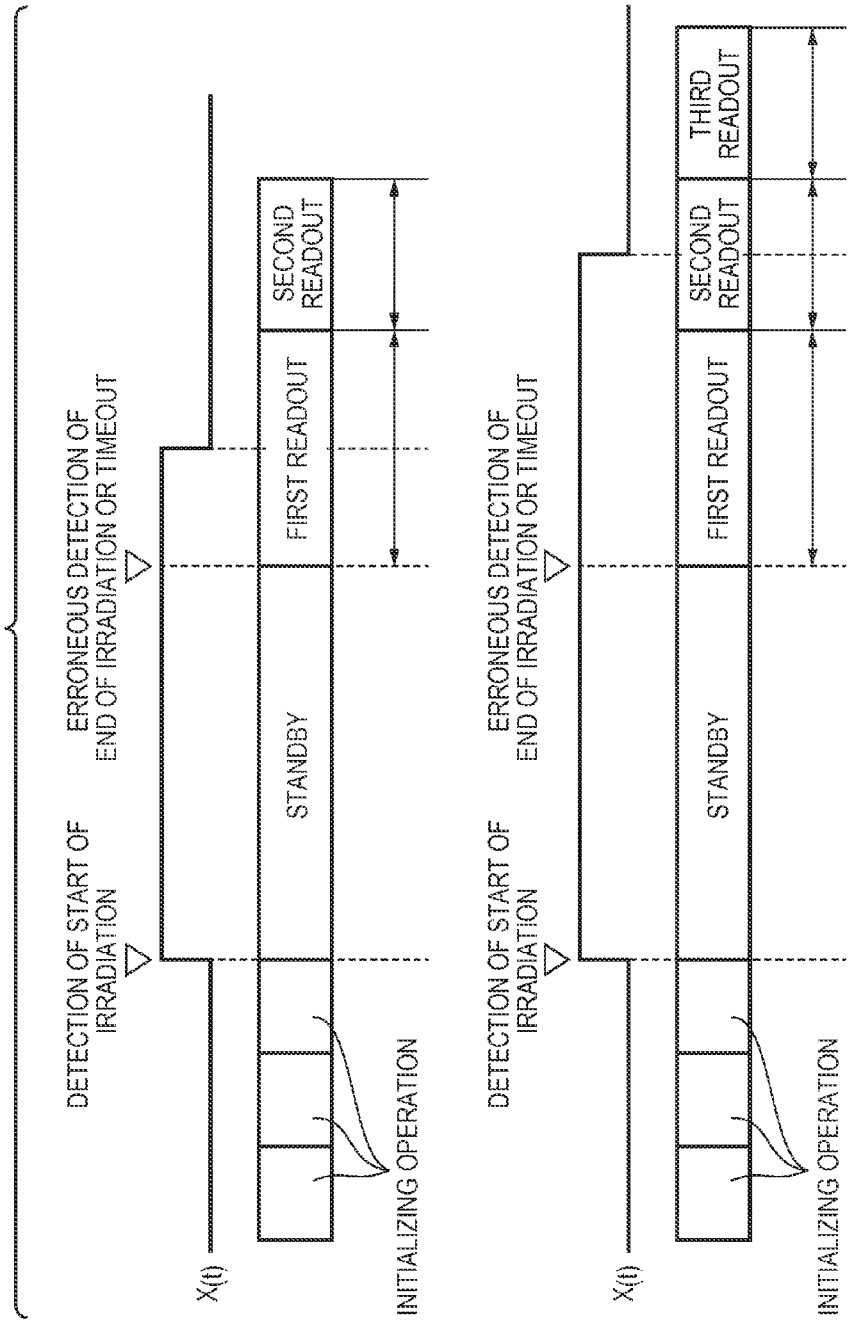

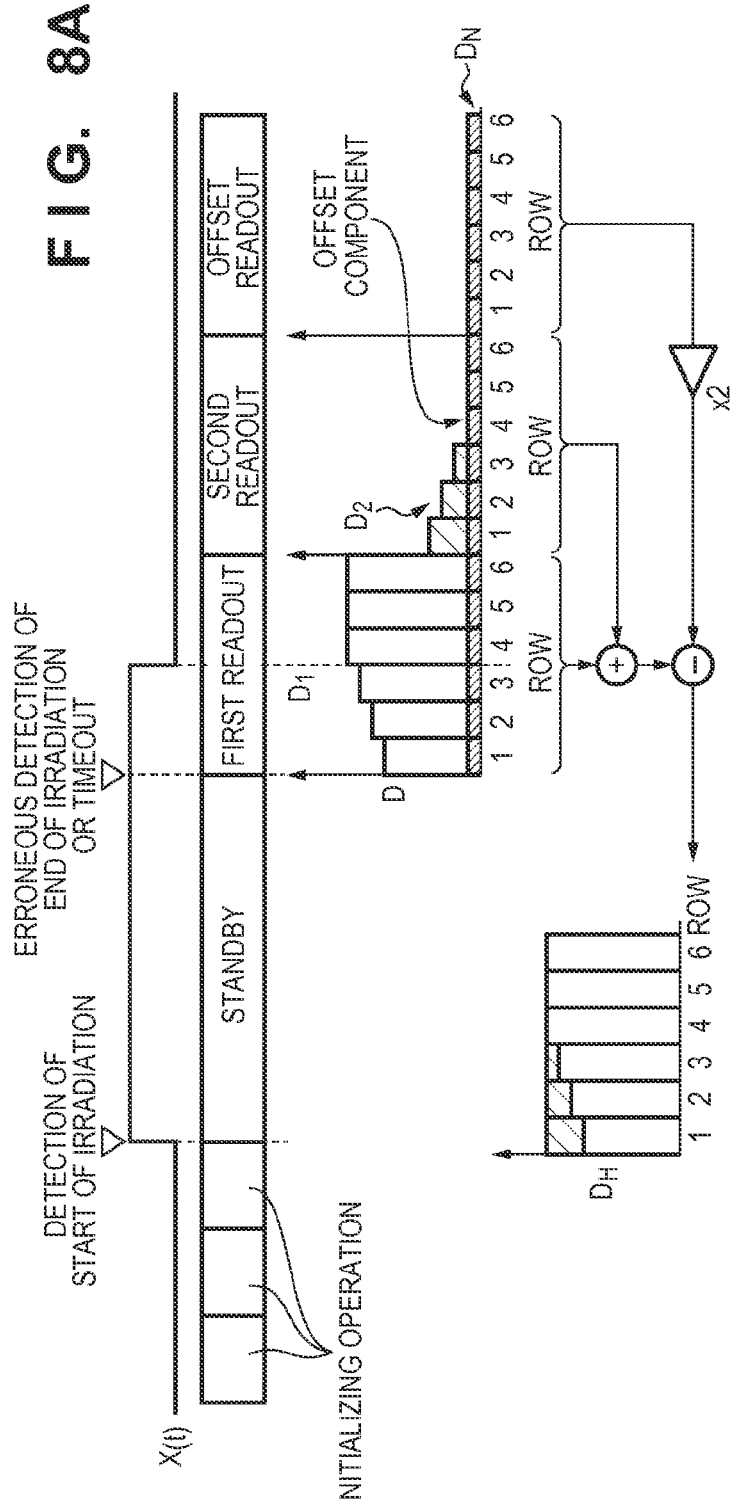
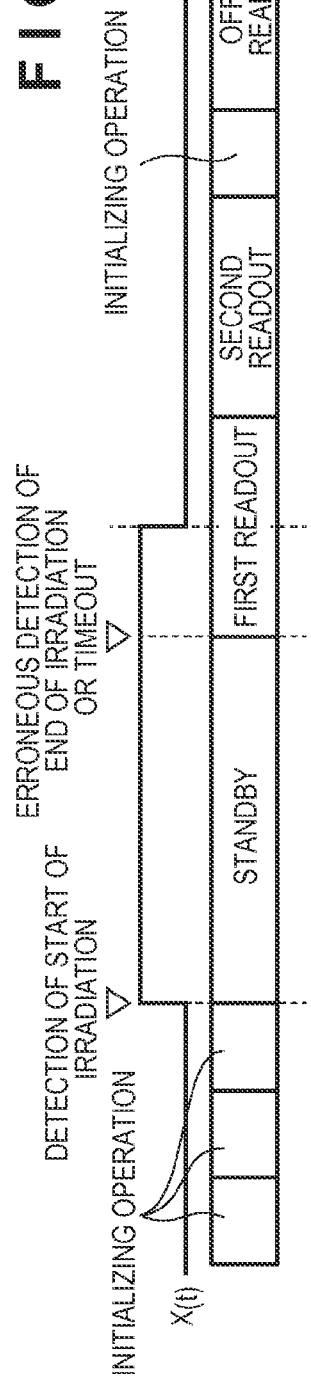

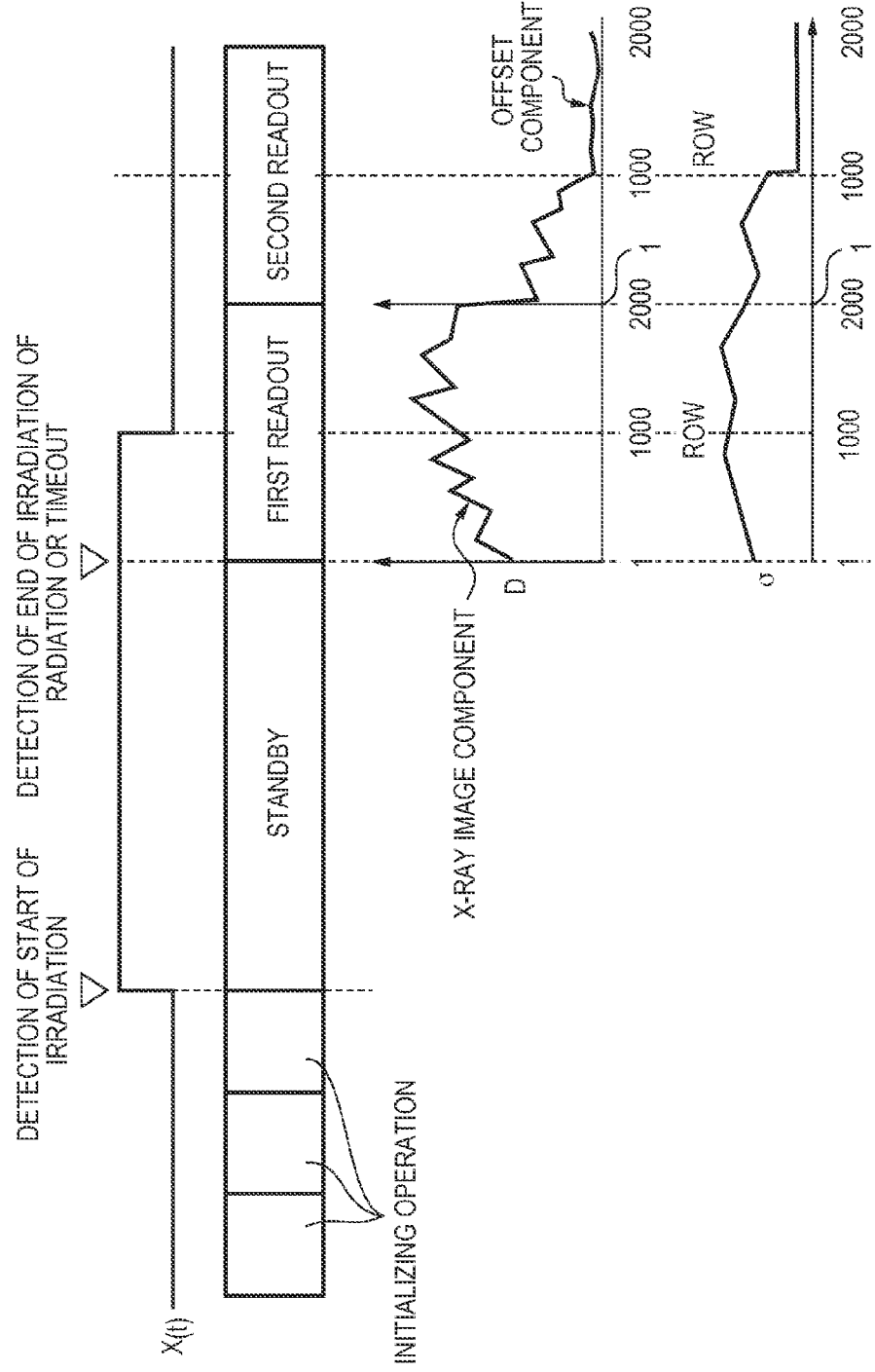

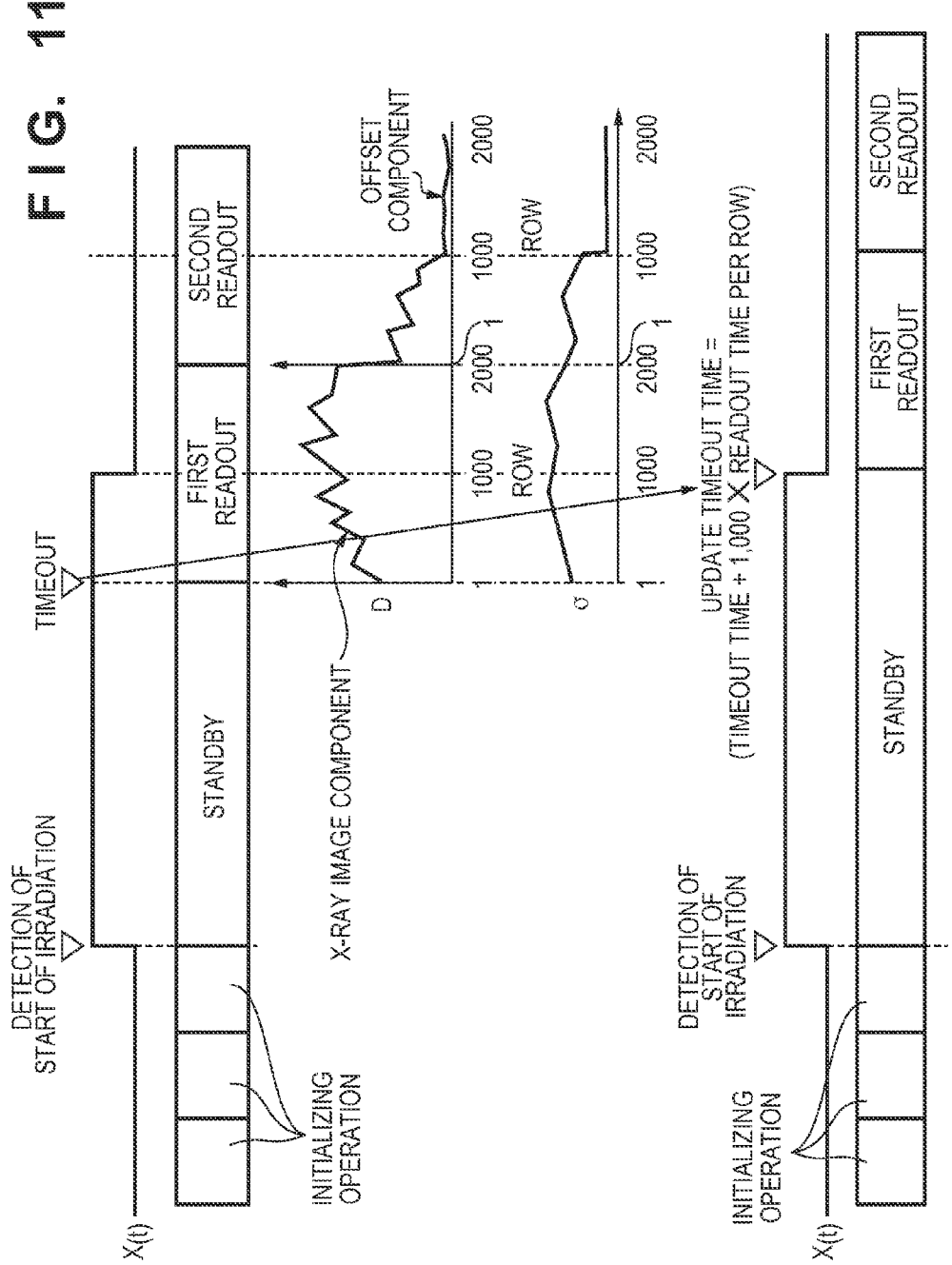

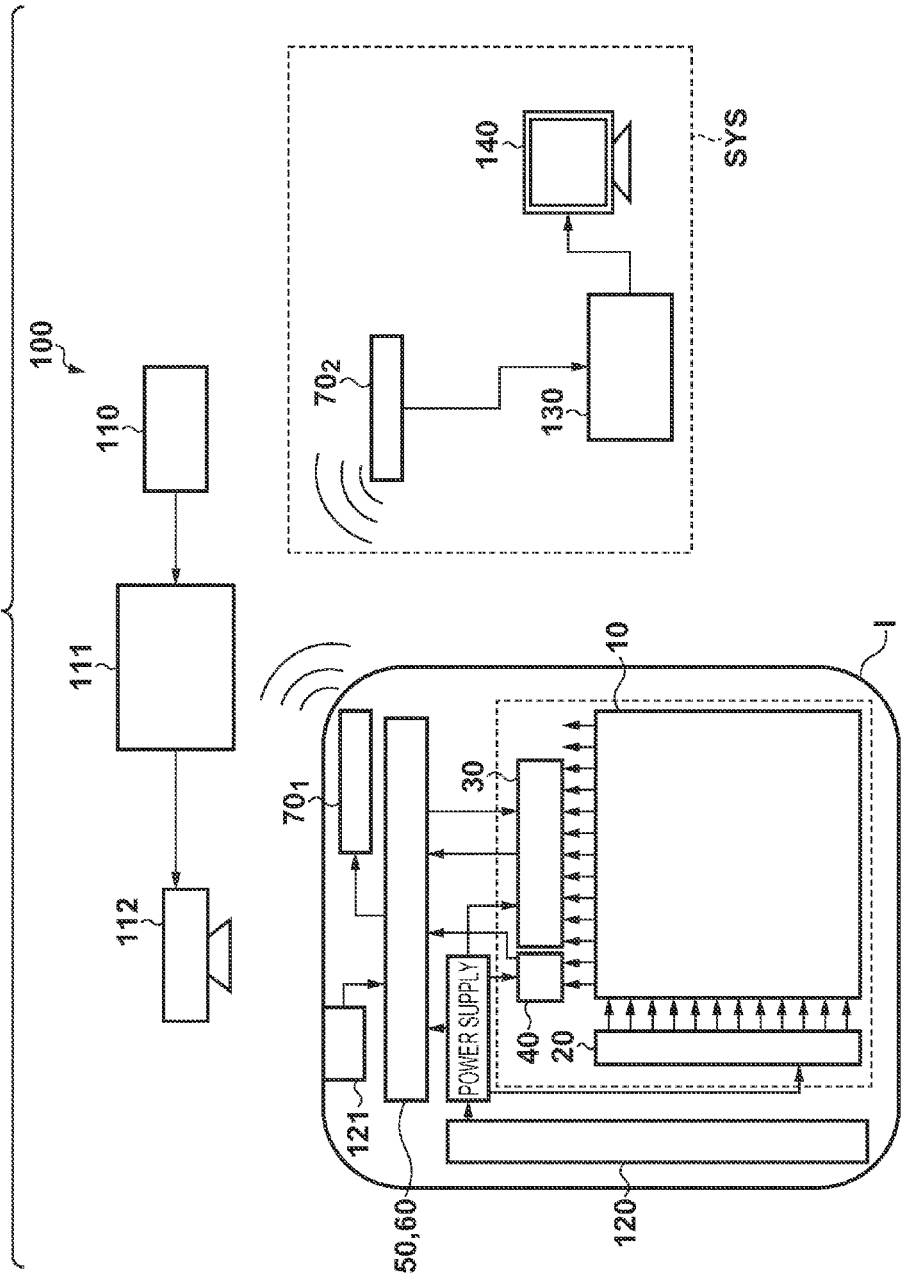

RADIATION IMAGING APPARATUS, METHOD FOR DRIVING THE SAME AND RADIATION IMAGING SYSTEM

BACKGROUND OF THE INVENTION

1. Field of the Invention

The present invention relates to a radiation imaging apparatus, a method for driving the same, and a radiation imaging system.

2. Description of the Related Art

A radiation imaging apparatus reads out, from a sensor array, a signal corresponding to the amount of charges accumulated in accordance with the irradiation of radiation and forms a radiation image based on this signal. Japanese Patent Laid-Open No. 9-140691 discloses a method for forming a radiation image by periodically reading out signals from a sensor array in the interval from before the irradiation of radiation to after the end of the irradiation, storing the respective obtained signals in a frame memory, and adding/averaging (or adding) the signals. Since this method periodically reads out signals from the sensor array, it is not necessary to synchronize the apparatus with the irradiation timing of radiation when performing radiation imaging. This method however leads to an increase in power consumption because of the necessity to always maintain the circuit in an active state, and requires a large-capacity memory for storing periodically readout signals in the frame memory.

In contrast to this, recently, there is available a technique of detecting the irradiation of radiation first and then automatically starting to read out signals from a sensor array in response to the detection. For example, Japanese Patent Laid-Open No. 2010-268171 discloses the arrangement of a radiation imaging apparatus including a detection means for detecting radiation for radiation imaging. This detection means detects radiation by detecting a current in a bias line connected to each sensor of the sensor array. This arrangement makes it possible to perform the initializing operation of initializing each sensor of the sensor array before, for example, the detection of radiation, and start the readout operation of reading out signals from the sensor array in response to the detection of radiation.

On the other hand, when starting irradiation of radiation in the middle of initializing operation, some of the signals which should be acquired are lost. In contrast to this, Japanese Patent Laid-Open No. 2002-181942 discloses a technique of correcting the signal obtained by readout operation by holding the signal read out from each sensor by initializing operation and compensating for the component lost due to the irradiation of radiation in the middle of initializing operation by using the held signal.

When starting readout operation during the irradiation of radiation, some of the signals which should be acquired are lost as in the above case. For example, under imaging conditions configured to irradiate weak radiation for long period of time, a detecting unit configured to detect radiation may erroneously detect the end of the irradiation of radiation or a timeout may occur without detection of the end of the irradiation. In such a case, a region where readout operation has started before the end of the irradiation of radiation differs in the amount of accumulated charges from a region where readout operation has started after the end of the irradiation of radiation. This makes it impossible to obtain a proper radiation image.

SUMMARY OF THE INVENTION

The present invention has been made in recognition of the above problem by the present inventor, and provides a technique advantageous in acquiring a good radiation image even when readout operation has started during the irradiation of radiation.

One of the aspects of the present invention provides a radiation imaging apparatus, comprising a sensor array configured to output a signal in accordance with irradiated radiation, a driving unit configured to output a signal from the sensor array by driving the sensor array, a detecting unit configured to detect irradiated radiation, a control unit configured to control the driving unit to perform first readout to read out a signal corresponding to charge accumulated in the sensor array from the sensor array and perform second readout to further read out a signal from the sensor array at least in a case where the first readout has started during irradiation of radiation, and a processing unit configured to correct the signal obtained by the first readout based on the signal obtained by the second readout.

Further features of the present invention will become apparent from the following description of exemplary embodiments with reference to the attached drawings.

BRIEF DESCRIPTION OF THE DRAWINGS

FIG. 7 is a view for explaining an example of the operation of another embodiment;

FIGS. 8A and 8B are timing charts in the second embodiment;

FIG. 9 is a view for explaining an example of the operation of the third embodiment;

FIG. 11 is a view for explaining another example of the operation of the third embodiment;

FIG. 13 is a view for explaining an example of the arrangement of a radiation imaging system.

DESCRIPTION OF THE EMBODIMENTS (First Embodiment)

Figure 1:
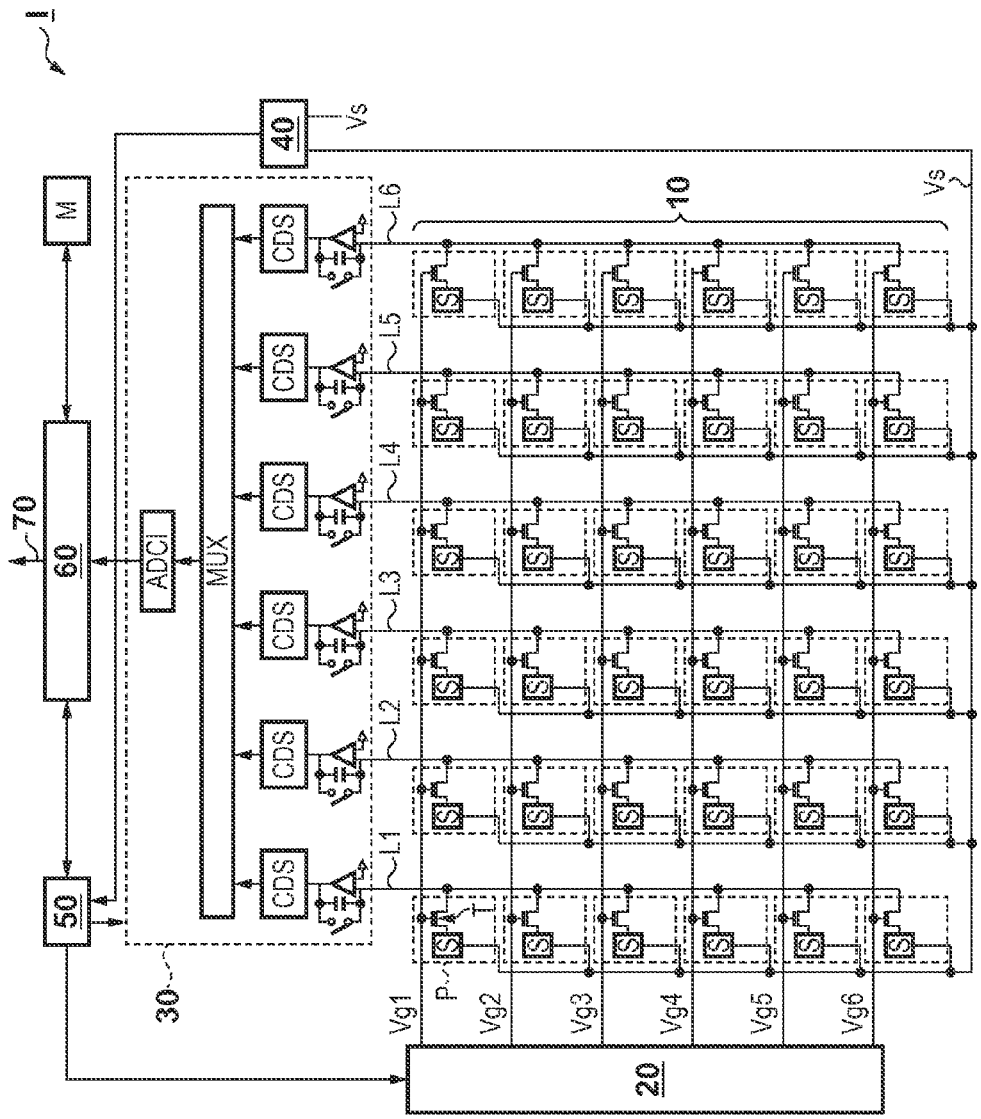
FIG. 1 is a circuit diagram for explaining an example of the arrangement of a radiation imaging apparatus according to the first embodiment.

A radiation imaging apparatus I according to the first embodiment will be described with reference to FIGS. 1 to 7. The radiation imaging apparatus I exemplarily shown in FIG. 1 includes a sensor array 10, a driving unit 20, a signal readout unit 30, a detecting unit 40, a control unit 50, and a processing unit 60. The sensor array 10 is constituted by a plurality of pixels P arranged to form a plurality of rows and a plurality of columns. When having a size of 43 cm×35 cm, the sensor array 10 includes about 2,700×2,200 pixels (a unit pixel size: 160 μm). In this case, however, for the sake of simplicity, the following will exemplify the sensor array 10 including 6 row×6 column pixels. It is possible to form the sensor array 10 by, for example, the respective elements on a glass substrate by using an amorphous silicon film or amorphous silicon nitride film and forming electrodes by using aluminum, aluminum alloy, ITO, or the like. Each pixel P includes a sensor S and a thin-film transistor T. The sensor S is formed from a photoelectric conversion element such as a PIN sensor or MIS sensor. A scintillator (not shown) which converts radiation into light is provided on the sensor array 10 so as to covert it. In this manner, each sensor S converts radiation entering the pixel P into an electrical signal. The sensor array 10 is provided with control signal lines Vg, that is, Vg1 to Vg6 in correspondence with the respective rows. The gate terminal of the thin-film transistor T of each pixel P is connected to a corresponding one of the control signals Vg and receives a control signal from the driving unit 20. This control signal sets the thin-film transistor T in a conductive state or non-conductive state. The sensor array 10 is also provided with column signal lines L, that is, L1 to L6 in correspondence with the respective columns. One terminal of the thin-film transistor T of each pixel P on each column is connected to a corresponding one of the column signal lines L. The other terminal of the thin-film transistor T is connected to a corresponding one of the sensors S. A signal from each sensor S is output to the signal readout unit 30 via the corresponding column signal L when the corresponding thin-film transistor T is set in a conductive state. The sensor array 10 outputs a signal corresponding to irradiated radiation. With this arrangement, the driving unit 20 includes, for example, a shift register, and drives the sensor array 10 for each row in accordance with a control signal from the control unit 50, thereby causing the sensor array 10 to output a signal.

The signal readout unit 30 samples signals on the respective columns read out from the sensor array 10 by using a sample/hold circuit SH, and removes noise components by using a CDS circuit based on a correlated double sampling method. A multiplexer MUX then sequentially inputs the signals to an analog/digital conversion unit ADC1 to convert them into digital signals.

As shown in FIG. 1, the processing unit 60 analyzes and processes signals (image signals) from the analog/digital conversion unit ADC1 belonging to the signal readout unit 30. The processing unit 60 can output a signal to the control unit 50 in accordance with a processing result, store the signal in a memory M, and transfer the result to the outside via a known communication means 70.

Figure 2A:
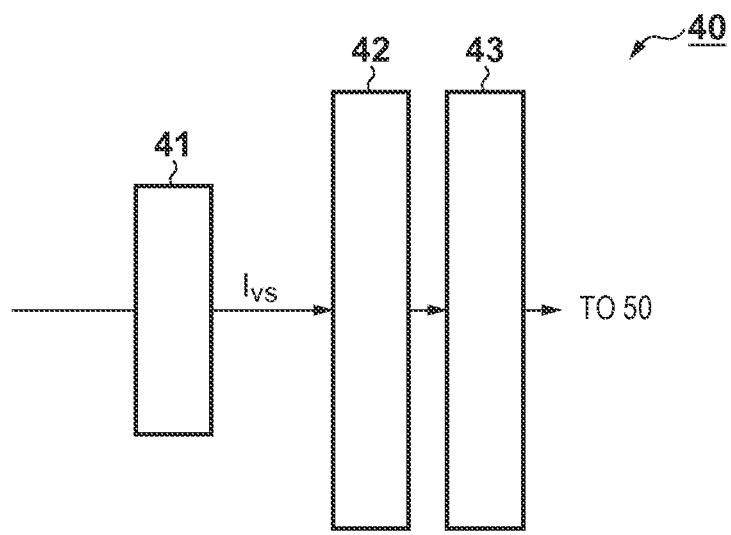
FIGS. 2A and 2B are views for explaining a detecting unit which detects radiation.
Figure 2B:
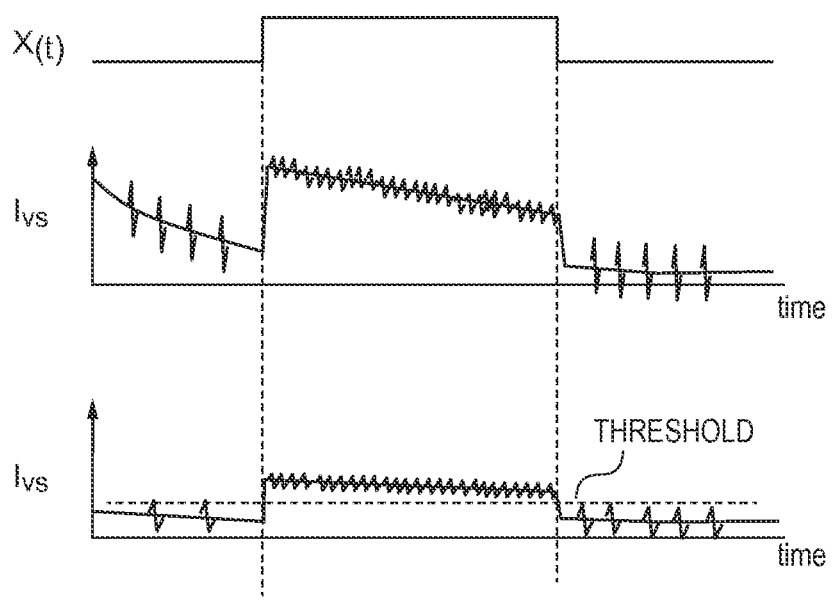

The detecting unit 40 detects irradiated radiation. As exemplarily shown in FIGS. 2A to 3B, this embodiment is configured to detect radiation by monitoring a current Ivs of a reference bias Vs of each sensor S. For example, the detecting unit 40 includes a current detecting unit 41, a calculation unit 42, and a determination unit 43, as shown in FIG. 2A. The current detecting unit 41 is formed from the circuit exemplarily shown in FIGS. 3A and 3B. This unit detects the current Ivs of the reference bias Vs and outputs the result to the calculation unit 42. The calculation unit 42 performs calculation processing including the removal of offset components and noise from a signal, and outputs the result to the determination unit 43. The calculation unit 42 can be formed from a reprogrammable integrated circuit such as an FPGA (Field-Programmable Gate Array). The calculation unit 42 may switch between programs for calculation. For example, the calculation unit 42 may read out a program from a memory (not shown) storing a plurality of programs, as needed. As shown in FIG. 2B, the determination unit 43 compares an output from the calculation unit 42 with a predetermined reference value (threshold) to determine whether radiation (intensity waveform X(t)) is irradiated. However, the detecting unit of the present invention is not limited to this. For example, it is possible to use, in addition to the sensor array, a direct type sensor which directly converts radiation into an electrical signal, a form obtained by applying a phosphor which converts radiation into visible light, or the like to an Si photodiode.

Figure 3A:
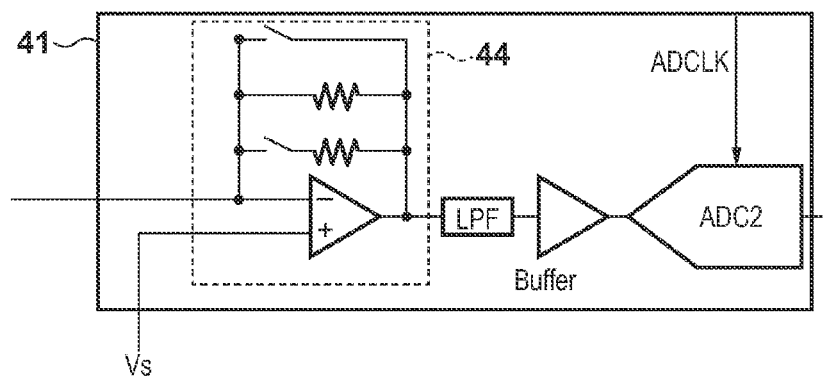
FIGS. 3A and 3B are circuit diagrams for explaining an example of the arrangement of the detecting unit.
Figure 3B:
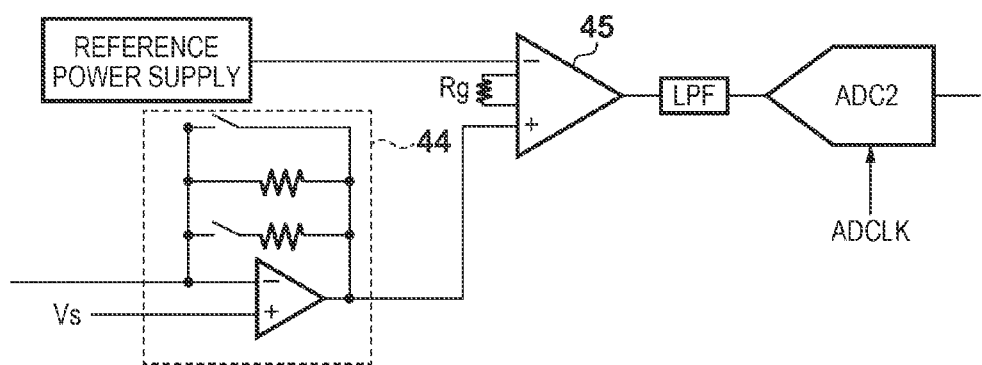

The current detecting unit 41 exemplarily shown in FIG. 3A includes a current/voltage conversion unit 44 which converts the current of the reference bias Vs into a voltage, a low-pass filter LPF which removes high-frequency noise, a buffer Buffer, and an analog/digital conversion unit ADC2. As the current/voltage conversion unit 44, for example, a known circuit arrangement using an operational amplifier, feedback resistors, and a reset switch may be used. The current/voltage conversion unit 44 can change the amplification factor when converting a current value into a voltage by, for example, changing a combined resistance R (for example, $0 < R \leq 1M\ [\Omega]$) by switching between the feedback resistors arranged in parallel with each other. The low-pass filter LPF removes high-frequency noise propagating through the power supply line of the reference bias Vs from the output signal. The resultant signal is then input to the analog/digital conversion unit ADC2 via the buffer Buffer. As shown in FIG. 3B, a reference power supply for applying a reference voltage may be prepared, and an instrumentation amplifier 45 may be used as the current detecting unit 41. The instrumentation amplifier 45 can be disposed between the current/voltage conversion unit 44 and the low-pass filter LPF. According to this arrangement, for example, it is possible to set a gain by adjusting a resistance Rg of an external resistor added to the instrumentation amplifier 45. In addition, it is possible to decide the resolution of analog/digital conversion by using a clock signal ADCLK based on which the analog/digital conversion unit ADC2 operates. The frequency of the clock signal ADCLK may be decided so as to follow up the readout rate of signals from the sensor array 10, and a proper frequency may be selected in accordance with specifications.

Figure 4:
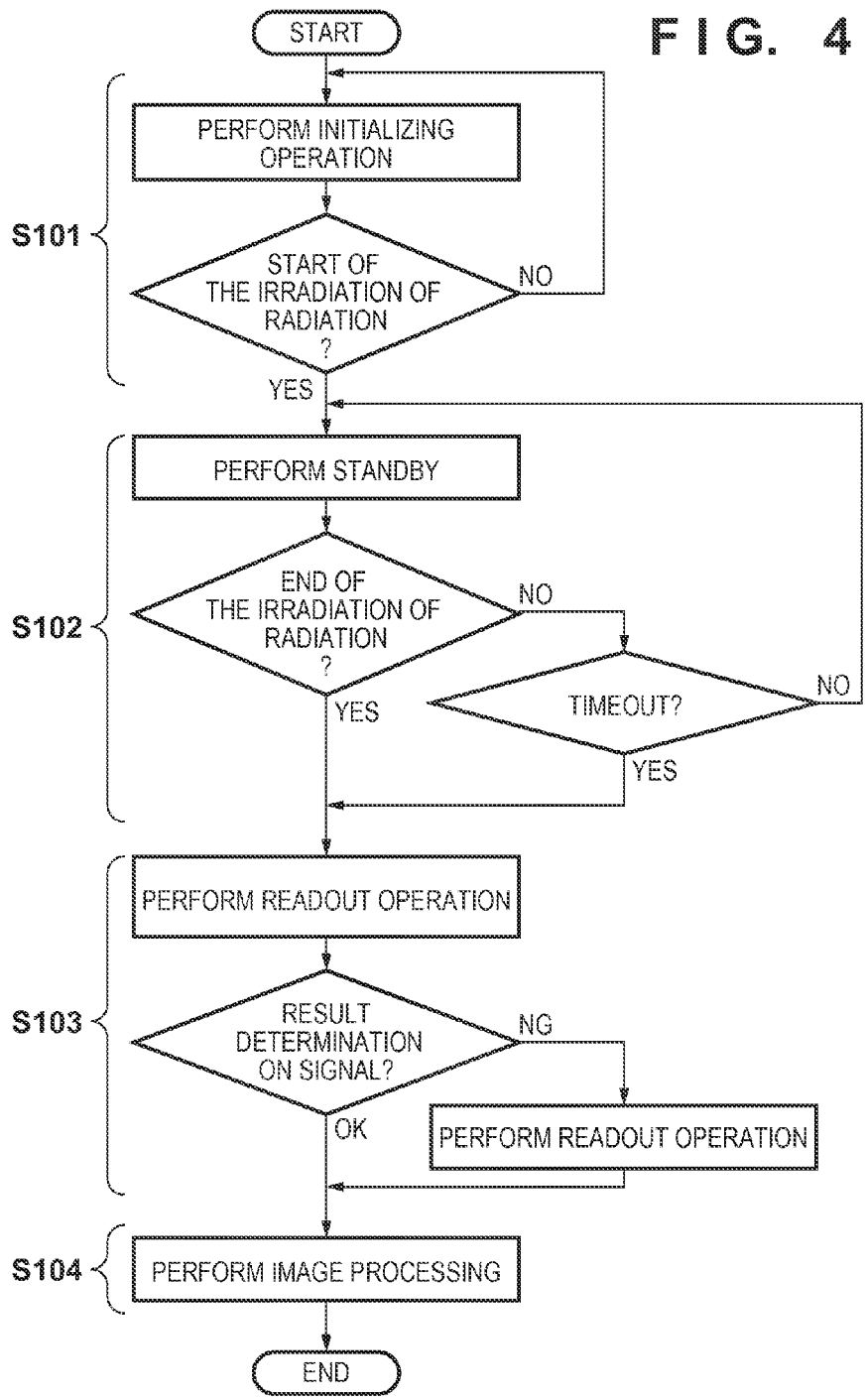
FIG. 4 is a flowchart in the first embodiment.

FIG. 4 is a flowchart showing the operation of a radiation imaging apparatus I. In step S101, the apparatus repeats reset processing for the sensor array 10 by sequentially initializing the sensors S for each row until the detecting unit 40 detects the start of the irradiation of radiation. This operation is performed by setting the thin-film transistor T of each pixel P in a conductive state and will be referred to as "initializing operation". The apparatus performs this initializing operation to initialize the charges accumulated due to the dark currents generated in the respective sensors S. While performing initializing operation, the apparatus can reduce power consumption by, for example, setting the signal readout unit 30 in an idle state. The apparatus repeats initializing operation to periodically initialize the sensors S until the process advances to step S102. In response to the detection of the start of the irradiation of radiation by the detecting unit 40, the radiation imaging apparatus I stands by in step S102 until the detecting unit 40 detects the end of the irradiation of radiation. In this state, the thin-film transistor T of each pixel P is in a non-conductive state, and the charges generated in each sensor S are accumulated. The amount of charges accumulated is based on the dose of irradiated radiation. In response to the detection of the end of the irradiation of radiation by the detecting unit 40, thereafter, the apparatus sequentially reads out signals from the sensor array 10 in step S103. As in initializing operation, the apparatus performs this operation by setting the thin-film transistor T of each pixel P in a conductive state. This operation will be referred to as "readout operation". If the signal readout unit 30 is in an idle state, the apparatus sets the signal readout unit 30 in an operative state when shifting to readout operation. Each signal obtained by this readout operation is output to the processing unit 60 as described above. In this case, the processing unit 60 analyzes this signal no determine whether, for example, the readout operation has started during the irradiation of radiation. If the determination result indicates that the readout operation has started during the irradiation of radiation, the apparatus performs readout operation again. Subsequently, in step S104, the processing unit 60 generates image data based on the signal obtained by the above operation.

Figure 5:
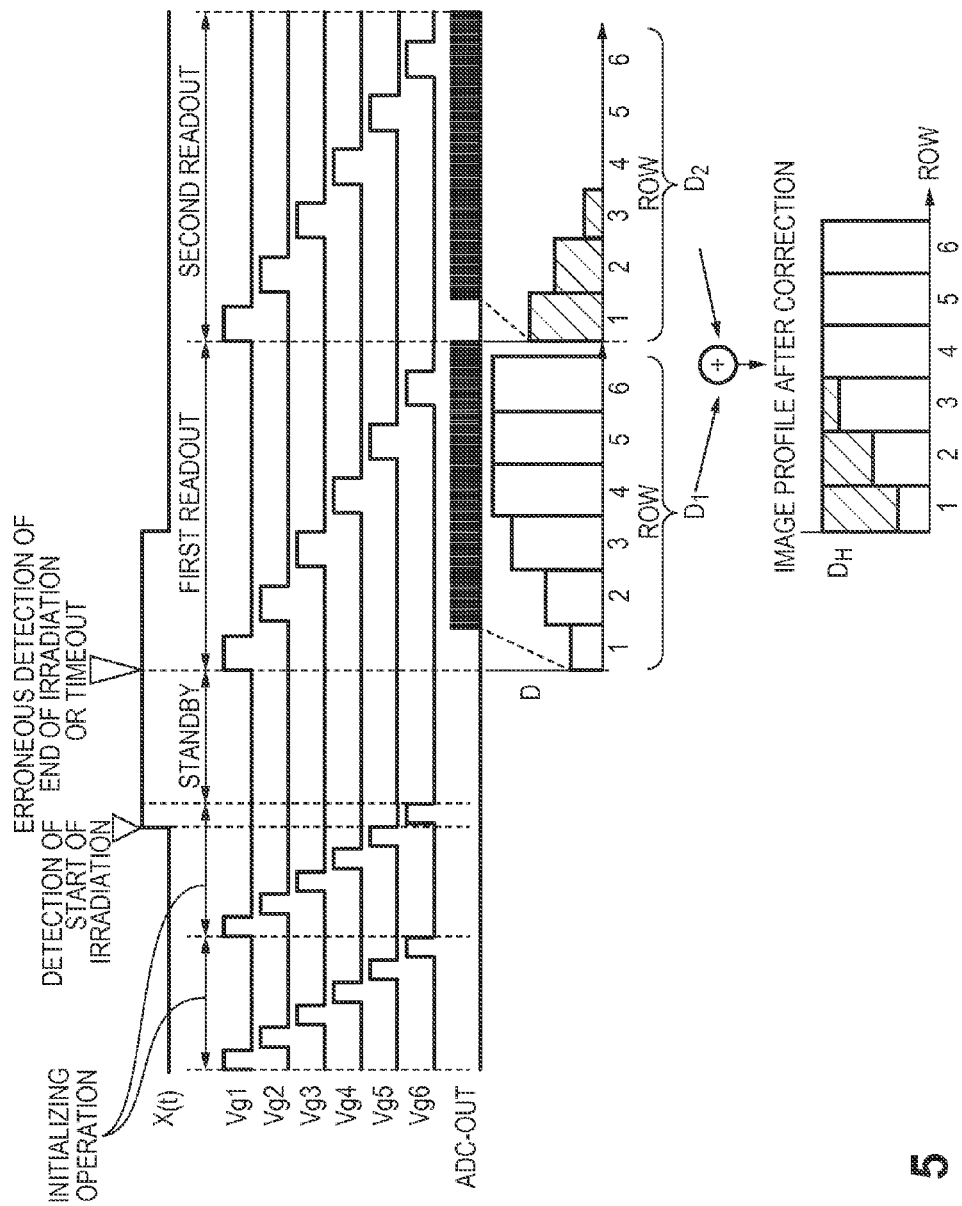
FIG. 5 is a timing chart in the first embodiment.
Figure 6:
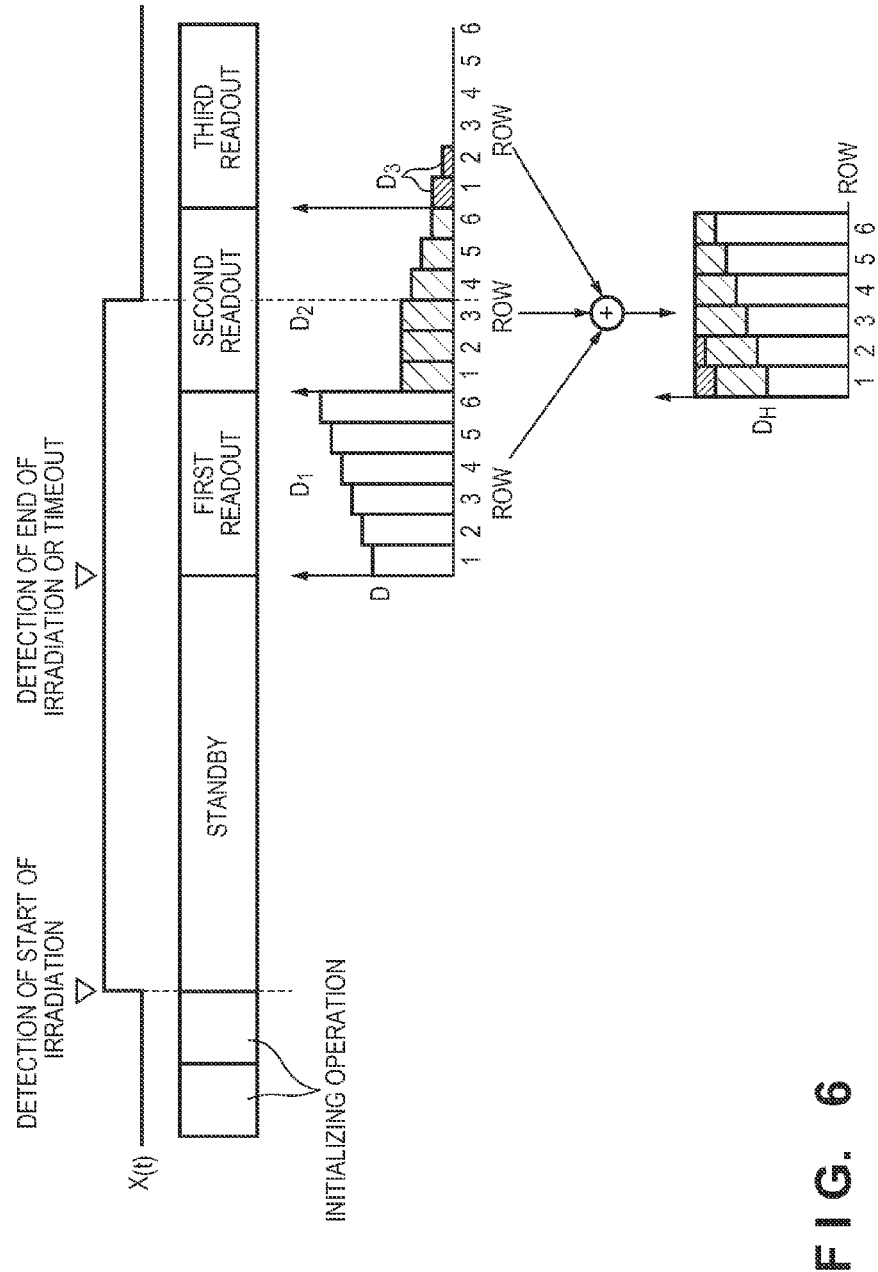
FIG. 6 is another timing chart in the first embodiment.
Figure 10A:
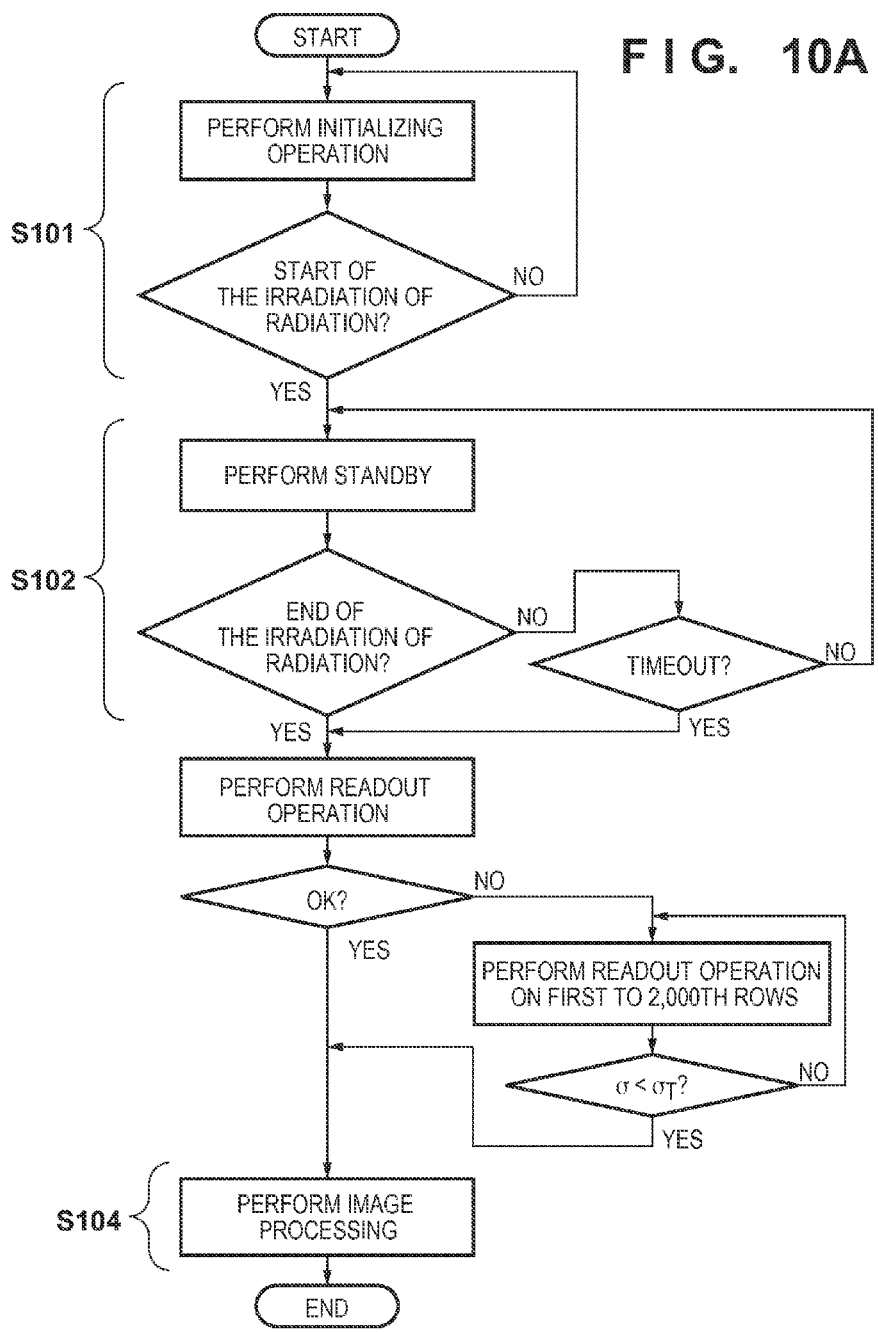
FIGS. 10A and 10B are flowcharts in the third embodiment.
Figure 10B:
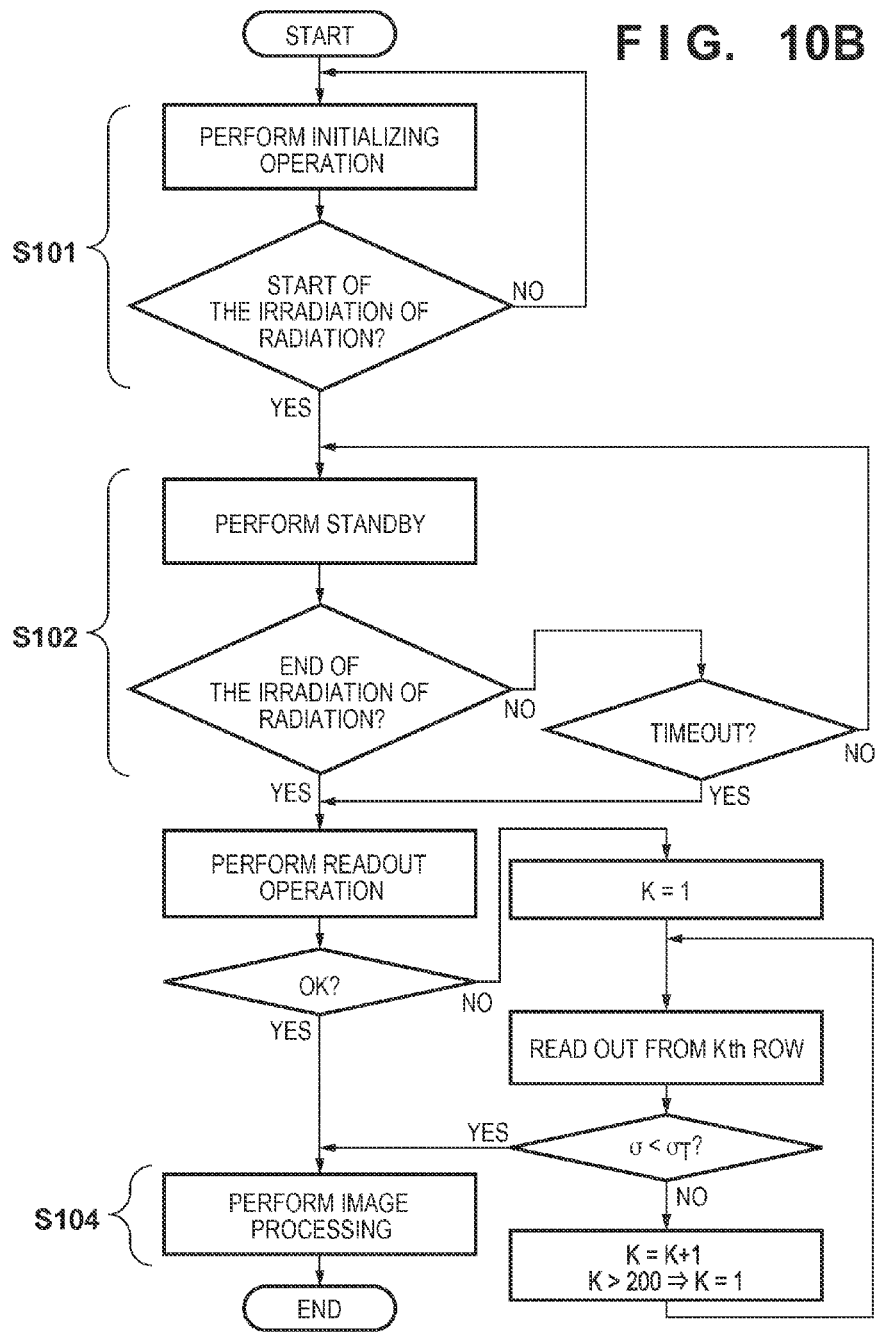
Figure 12:
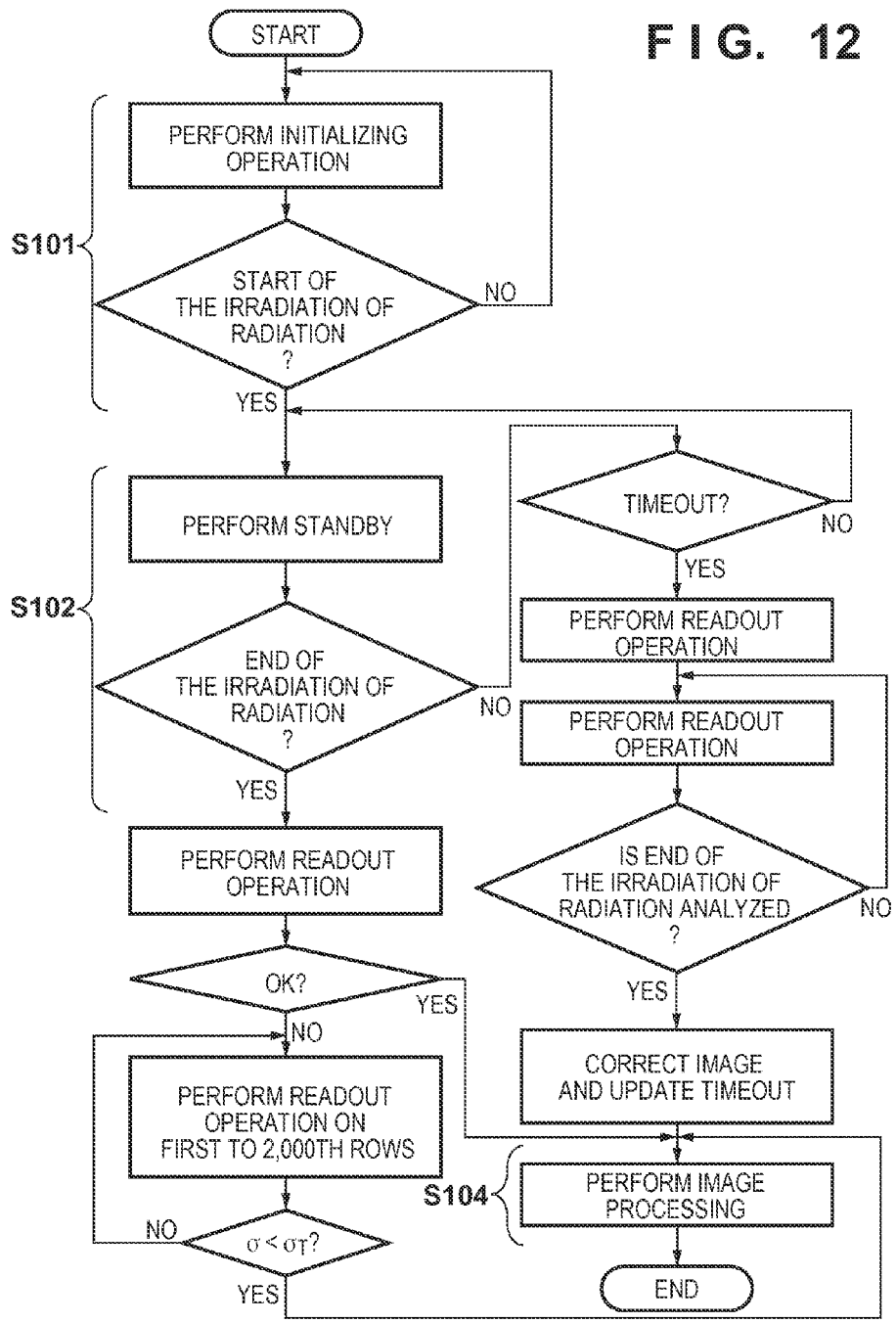
FIG. 12 is another flowchart in the third embodiment.

FIG. 5 is a timing chart for the radiation imaging apparatus I when starting the first readout operation during the irradiation of radiation. With the abscissa representing the time, this timing chart sequentially shows, from above, an intensity waveform X(t) of radiation, the waveforms of pulses propagating through the control signal lines Vg, that is, Vg1 to Vg6, an output ADC_OUT from the analog/digital conversion unit ADC1, and a corresponding digital signal D. In this case, for the sake of simplicity, consider a case in which radiation has uniformly entered all the sensors S, and the irradiation of radiation has stopped when the apparatus has read out signals up to the third row. In this case, since the apparatus has performed readout operation on the sensors S on the first to third rows during the irradiation of radiation, the apparatus does not read out signals corresponding to the charges accumulated after the completion of the readout operation. A signal $D_1$ from the sensor S on the first row has the smallest value because of the largest amount of signal which has not been read out, and signals $D_1$ have larger values in the order of the second and third rows. On the other hand, since the apparatus has completed readout operation on the sensors on the fourth to sixth rows after the end of the irradiation of radiation, the apparatus has read out all the signals corresponding to the charges accumulated during the irradiation of radiation. Therefore, signals $D_1$ from the sensors S on the fourth to sixth rows have the same largest value.

Subsequently, the apparatus starts the second readout operation. In this case, for the sensors S on the first to third rows the apparatus reads out signals corresponding to the charges accumulated in the interval from the end of the first readout operation to the end of the irradiation of radiation, and hence signals $D_2$ sequentially decrease in value in the order of the first, second, and third rows. For the sensors S on the fourth to sixth rows, the apparatus has completely read out the signals based on the irradiation of radiation in the first readout operation, and hence cannot obtain the signals $D_2$ in the second readout operation.

In this manner, the control unit 50 controls the driving unit 20 so as to perform the first readout operation (first readout) after the end of the irradiation of radiation and then perform the second readout operation (second readout). That is, the apparatus performs the first readout in response to the detection result obtained by the detecting unit 40, and reads out signals (signals $D_1$) corresponding to the charges accumulated in the sensor array 10 from the sensor array 10. The apparatus performs the second readout to further read out signals (signals $D_2$) from the sensor array 10 if at least the first readout has started during the irradiation of radiation. The apparatus may determine whether the first readout has started during the irradiation of radiation, by determining whether the signal obtained by the first readout has reached a predetermined reference value. Consider a case in which the apparatus performs the second readout when the detecting unit 40 erroneously detects the end of the irradiation of radiation in spite of the fact that the irradiation of radiation has not stopped. Such a case can occur due to an unintentional cause, for example, when noise has unexpectedly occurred due to an external environment or the output level of the radiation source has decreased. Such cases may include, for example, a case in which the apparatus forcibly starts the first readout when a preset timeout time elapses after the detecting unit 40 detects the start of the irradiation of radiation, more specifically, when the detecting unit 40 cannot detect the end of the irradiation of radiation. In these cases, since the apparatus has performed the first readout during the irradiation of radiation, the signal $D_1$ does not include any signal (that is, the signal $D_2$) corresponding to the charges accumulated after the first readout. The apparatus therefore performs the second readout described above to acquire the signal $D_2$.

In this case, as shown in, for example, FIG. 5, the processing unit 60 obtains a signal $D_H$ by correcting the signal $D_1$ obtained by the first readout by adding the signal $D_1$ to the signal $D_2$ obtained by the second readout. In this manner, it is possible to generate a proper radiation image by acquiring the signal $D_2$ by correcting the signal $D_1$ obtained by the first readout based on the signal $D_2$ obtained by the second readout.

According to the above operation, it is possible to compensate for the information obtained by the first readout by using the information obtained by the second readout upon acquiring information included in radiation irradiated after the first readout by the second readout. Therefore, this embodiment can improve the quality of a radiation image.

This embodiment has exemplified the case in which the apparatus performs the first readout, the second readout, and correction using the processing unit 60 for each row of the sensor array 10. However, the apparatus may perform these operations for two rows at a time (or for three or more rows at a time). In addition, the apparatus may be designed to perform the second readout if, at least, the first readout has started during the irradiation of radiation, and may perform the above correction by performing the second readout regardless of the result on the first readout. As exemplarily shown in FIG. 6, if the second readout has started during the irradiation of radiation, the apparatus may further perform the third readout to read out signals (signal $D_3$) from the sensor array 10. Furthermore, the apparatus may perform similar correction by performing the four or more readout operations within the specification range of the radiation imaging apparatus I. Alternatively, for example, as shown in FIG. 7, the apparatus may perform the second readout in a term shorter than that of the first readout. This method can acquire a radiation image in a time shorter than that in each embodiment while obtaining the same effect as described above, if the duration of the wave tail of the intensity waveform of radiation is short. It is also possible to reduce the power consumption. In addition, the sensor array 10 according to this embodiment has exemplified the arrangement configured to convert irradiated radiation into light by the scintillator first and then convert the light into an electrical signal by photoelectric conversion. However, the present invention is not limited to this. For example, the sensor array 10 may use an arrangement configured to directly convert radiation into an electrical signal by using, as each sensor S, a photoelectric conversion element formed from amorphous selenium.

(Second Embodiment)

A radiation imaging apparatus I of the second embodiment will be described with reference to FIGS. 8A and 8B. This embodiment differs from the first embodiment in that a control unit 50 performs offset readout after the second readout, as exemplarily shown in FIG. 8A. In offset readout, after performing the second readout, the apparatus further reads out signals from a sensor array 10 to acquire the offset components of the signals from the sensor array 10. Such offset components include the offset components which a signal readout unit 30 has or noise components caused by the dark currents generated in the sensor array 10. A processing unit 60 may remove the offset components by the correction described in the first embodiment. More specifically, the apparatus may subtract a signal corresponding to $2 \times D_N$ from a signal $D_H$ obtained by adding signals $D_1$ and $D_2$ including signals $D_N$ each corresponding to an offset component. This makes it possible to improve the quality of a radiation image. As shown in FIG. 8B, the apparatus may perform initializing operation between the second readout and the offset readout.

(Third Embodiment)

A radiation imaging apparatus I according to the third embodiment will be described with reference to FIGS. 9 to 12. As described in this embodiment, the apparatus may determine, from a standard deviation σ concerning each readout signal, whether readout operation has started during the irradiation of radiation. For example, the apparatus can determine, from the large standard deviation σ of a signal D obtained by readout operation, that the signal D has information about the inside of the body of the subject. For example, a processing unit 60 performs readout operation for each row, and calculates the standard deviation σ from signals for each column on the corresponding row while performing the readout operation. The apparatus can determine whether the readout operation has started during the irradiation of radiation, based on the calculated standard deviation σ, for example, whether the standard deviation has reached a predetermined reference value $σ_T$.

FIG. 9 exemplifies a case in which a radiation imaging apparatus I having a sensor array 10 with 2,000 row×2,000 column sensors starts readout operation during the irradiation of radiation, and reads out signals from sensors S corresponding to 1,000 rows during the irradiation. In this embodiment, the standard deviation σ of a signal $D_2$ obtained by the second readout starts to decrease from the 1,000th row. The apparatus acquires a signal $D_H$ from a signal $D_1$ obtained by the first readout and the signal $D_2$ obtained by the second readout and decides not to perform the third readout. Subsequently, the apparatus can generate a radiation image in the same manner as described above. According to this embodiment, the apparatus can perform readout operation up to the last row of the sensor array 10 (see FIG. 10A) or interrupts the readout operation in the middle of the processing. This makes it possible to, for example, reduce the power consumption (see FIG. 10B).

In addition, this embodiment can specify a specific row of the sensor array 10 up to which readout operation has been performed during the irradiation of radiation. FIG. 11 shows a case in which the apparatus has forcibly started the first readout because a preset timeout has elapsed after the detection of the start of the irradiation of radiation by a detecting unit 40. This embodiment can update a timeout time to a proper time if it is possible to determine that the timeout time is improper (see FIG. 12).

Although the above three embodiments have been described above, the present invention is not limited to them. The objects, states, applications, functions, and other specifications of the present invention can be changed as needed, and other embodiments can implement the present invention.

(Radiation Imaging System)

The radiation imaging apparatus I according to each embodiment described above can be applied to a radiation imaging system 100, as exemplarily shown in FIG. 13. Radiation includes electromagnetic waves and particle rays such as X-ray, α-rays, β-rays, γ-rays, and cosmic rays. For example, when the operator presses an emission switch 110, a radiation source 112 emits radiation in accordance with the conditions set in a radiation control unit 111. In response to this, the radiation imaging apparatus I performs the operation described in each embodiment described above.

The radiation imaging apparatus I can include, in addition to the units described above, a battery 120 which supplies power to each unit, a wireless communication device $70_1$ which communicates with an external system SYS, and sensors S for detecting the position information of the apparatus. The system SYS includes a wireless communication device $70_2$ for the communication, a computer 130, and a display 140. A computer 130 can have a function of managing the radiation imaging apparatus I and controlling its operation by the communication and a function of transmitting and receiving necessary information via a network in a hospital. The computer 130 can also have a function of controlling and displaying a GUI (Graphical User Interface) displayed on the display 140 and a function of processing an image signal from the radiation imaging apparatus I. These functions may be implemented by software or hardware using dedicated ICs or programmable ICs.

When performing radiation imaging, it is possible to use a grid for removing scattered radiation. The radiation imaging apparatus I may use a Bucky table or a supine position table. The radiation imaging apparatus I may further include a recharger for the battery 120. As the computer 130, a plurality of computers 130 may be used or a mobile personal computer may be used. When it is not possible to obtain sufficient radio waves for wireless communication, the apparatus may communicate by wired communication using a cable or the like. The radiation imaging apparatus I may communicate with a plurality of systems SYS.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-192290, filed Aug. 31, 2012, which is hereby incorporated by reference herein in its entirety.

What is claimed is:

1. A radiation imaging apparatus comprising:
a sensor array configured to output a signal in accordance with irradiated radiation;
a driving unit configured to output a signal from the sensor array by driving the sensor array;
a detecting unit configured to detect irradiated radiation;
a control unit configured to control the driving unit to perform a first readout to read out a signal corresponding to charge accumulated in the sensor array from the sensor array and perform a second readout to further read out a signal from the sensor array at least in a case where the first readout has started during irradiation of radiation; and
a processing unit configured to correct the signal obtained by the first readout based on the signal obtained by the second readout,
wherein the control unit acquires an offset component of a signal from the sensor array by further reading out a signal from the sensor array after the second readout, and
wherein the processing unit obtains a signal by adding the signal obtained by the first readout and the signal obtained by the second readout, and removes the offset component from the signal obtained by the addition.

2. The apparatus according to claim 1, wherein the first readout starts in response to detection of the end of the irradiation of radiation by the detecting unit.

3. The apparatus according to claim 1, wherein the first readout starts in response to an elapse of a preset time after detection of the start of the irradiation of radiation.

4. The apparatus according to claim 1, wherein processing by the processing unit and the first readout and the second readout are performed for every two or more rows of the sensor array.

5. The apparatus according to claim 4, wherein the processing unit subtracts twice the offset component from the signal obtained by the addition.

6. The apparatus according to claim 1, wherein the sensor array includes a plurality of sensors arranged to form a plurality of rows and a plurality of columns, and the first readout, the second readout and correction using the processing unit are performed for each row of the plurality of sensors.

7. The apparatus according to claim 6, wherein the control unit determines whether the first readout has started during irradiation of radiation, based on a standard deviation calculated for each signal on each column of the plurality of sensors which is obtained by the first readout performed for each row of the plurality of sensors.

8. A radiation imaging system comprising:
   a radiation imaging apparatus defined in claim 1; and
   a radiation source configured to generate radiation.

9. The apparatus according to claim 1, wherein the processing unit determines whether or not the first readout has started during the irradiation of radiation, by determining whether or not the signal obtained by the first readout has reached a predetermined reference value.

10. The apparatus according to claim 1, wherein the processing unit determines whether or not the first readout has started during the irradiation of radiation, based on a standard deviation concerning the signal obtained by the first readout.

11. A method of driving a radiation imaging apparatus including a sensor array configured to output a signal in accordance with irradiated radiation and a detecting unit configured to detect irradiated radiation, the method comprising:
   reading out a signal corresponding to charge accumulated in the sensor array from the sensor array;
   further reading out a signal from the sensor array at least in a case where signal readout performed in the reading out the signal has started during irradiation of radiation;
   acquiring an offset component of a signal from the sensor array by further reading out a signal from the sensor array after the further reading out;
   obtaining a signal by adding the signal obtained by the reading out and the signal obtained by the further reading out; and
   removing the offset component from the signal obtained by the addition.

* * * * *